(12) United States Patent
Szentmihalyi et al.

(10) Patent No.: US 7,867,099 B2
(45) Date of Patent: Jan. 11, 2011

(54) CONNECTING ARRANGEMENT BETWEEN A SHAFT JOURNAL AND A JOINT PART

(75) Inventors: Volker Szentmihalyi, Gutach (DE); Mathias Lutz, Tuebingen (DE); Ewald Baechle, Hausach (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 0 days.

(21) Appl. No.: 12/390,659

(22) Filed: Feb. 23, 2009

(65) Prior Publication Data

US 2009/0208276 A1    Aug. 20, 2009

Related U.S. Application Data

(63) Continuation of application No. PCT/DE2007/001465, filed on Aug. 17, 2007.

(30) Foreign Application Priority Data

Aug. 23, 2006   (DE) .................. 10 2006 039 575

(51) Int. Cl.
*F16D 1/06* (2006.01)
(52) U.S. Cl. .................. 464/182; 464/906; 403/342
(58) Field of Classification Search .................. 464/182, 464/905, 906, 173; 403/332, 342, 359.5, 403/375
See application file for complete search history.

(56) References Cited

U.S. PATENT DOCUMENTS

| 2,440,739 | A |   | 5/1948 | Conroy |
| 2,449,284 | A | * | 9/1948 | Dorman .................. 403/342 X |
| 2,539,003 | A | * | 1/1951 | Agustoni ................ 403/342 X |
| 2,815,231 | A | * | 12/1957 | Wilson ........................ 403/342 |
| 3,396,554 | A |   | 8/1968 | Westercamp |
| 3,798,927 | A |   | 3/1974 | Girguis |
| 5,665,001 | A |   | 9/1997 | Jacob et al. |
| 6,949,025 | B1 |   | 9/2005 | Kraus et al. |
| 7,691,001 | B2 | * | 4/2010 | Lutz et al. ................... 464/182 |
| 2008/0107477 | A1 |   | 5/2008 | Cermak |

FOREIGN PATENT DOCUMENTS

| DE | 2 205 798 | 1/1973 |
| DE | 4419342 C1 | 7/1995 |
| DE | 102 15 657 A1 | 10/2003 |
| EP | 1 519 063 B1 | 3/2005 |
| FR | 2 712 049 A1 | 5/1995 |
| GB | 624872 | 6/1949 |
| WO | WO 2006/037389 A1 | 4/2006 |
| WO | WO 2007/044003 A1 | 4/2007 |

OTHER PUBLICATIONS

International Search Report dated Dec. 20, 2007 with an English translation (Six (6) pages).

* cited by examiner

*Primary Examiner*—Greg Binda
(74) *Attorney, Agent, or Firm*—Crowell & Moring LLP

(57) ABSTRACT

A connecting arrangement between a shaft journal (2), which is mounted so as to be axially fixed with respect to a unit, and a joint part (10) which can be pivotably attached to the shaft journal in a rotationally fixed manner. A shaft nut (5) having an internal thread (6) which can be screwed onto an external thread (4) of the shaft journal, is provided with an additional external thread (8) onto which a further nut (12) can be screwed via a counter-thread (21) to produce an axially acting interlocking connection (13) between the further nut (12) and the joint part (10).

2 Claims, 6 Drawing Sheets

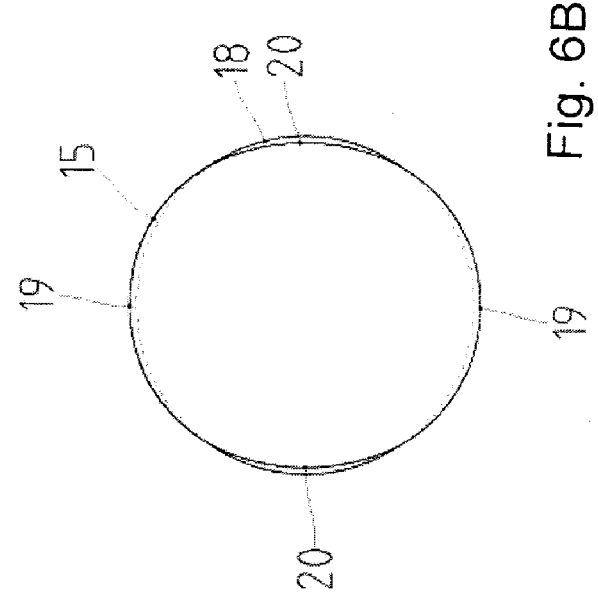
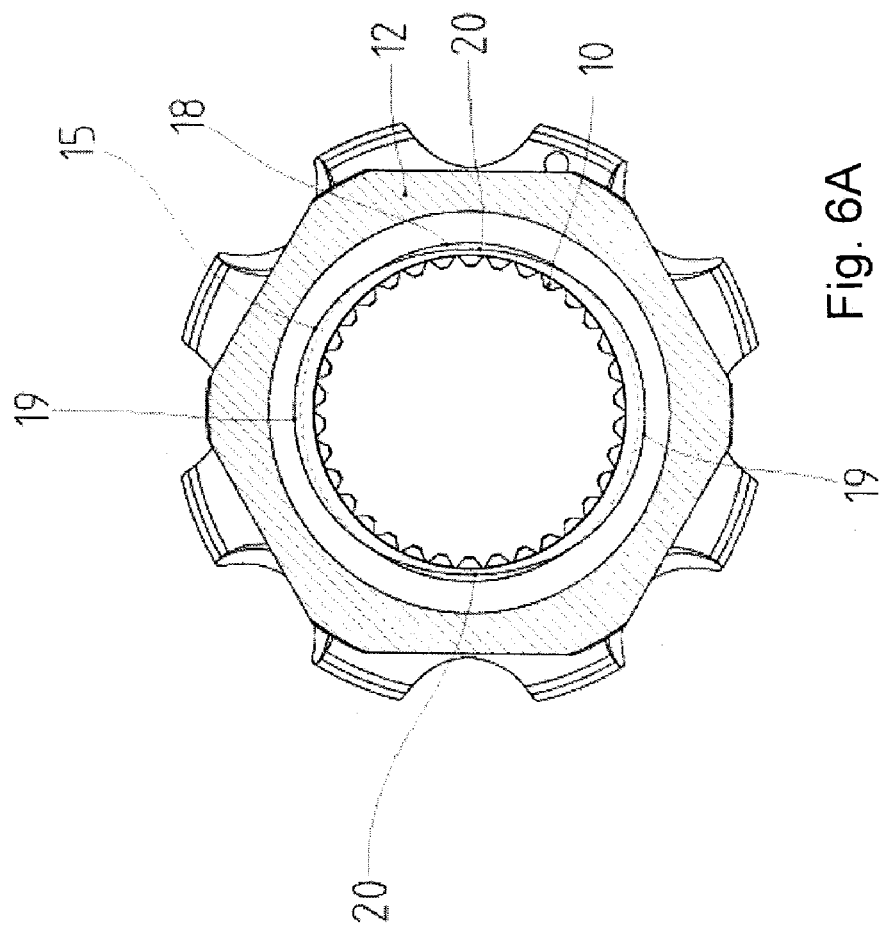

CONNECTING ARRANGEMENT BETWEEN A SHAFT JOURNAL AND A JOINT PART

CROSS REFERENCE TO RELATED APPLICATIONS

This application is a continuation of international patent application no. PCT/DE2007/001465, filed Aug. 17, 2007 designating the United States of America, and published in German on Feb. 28, 2008 as WO 2008/022625, the entire disclosure of which is incorporated herein by reference. Priority is claimed based on Federal Republic of Germany patent application no. DE 10 2006 039 575.1, filed Aug. 23, 2006.

BACKGROUND OF THE INVENTION

The present invention relates to a connecting arrangement between a shaft journal, such as the shaft journal of a transmission shaft in particular, and a joint part, such as the joint inner part of a constant-velocity fixed joint for a motor vehicle.

Such connecting arrangements are known from EP 1 519 063 A2 and US 2008/0107477 (=WO 2006/037389).

In an embodiment according to EP 1 519 063, a shaft nut is screwed onto a shaft journal, which forms the end of a transmission input shaft of a rear axle transmission, on which a clamping nut is provided so it is rotatable toward the shaft nut via a form-locking connection in the axial direction. Such transmissions are provided to the vehicle manufacturer as a pre-assembled unit having a shaft nut and a clamping nut seated loosely thereon. Before the shipping, the transmission itself must be balanced as a unit. The clamping nut mounted loosely on the shaft nut interferes with this. However, this interferes not only during the balancing, but rather also interferes with the noise testing of the transmission. The nut must therefore be fixed in some way for balancing and for the noise testing.

US 2008/0107477 discloses an embodiment of a connection between a shaft journal of a transmission and a constant-velocity rotary joint having a configuration in which a threaded sleeve, which may be screwed onto the shaft journal, is connected via a non-detachable connection to the joint inner part of a constant-velocity joint. In another illustrative embodiment, an intermediate sleeve is also used, which is welded to the joint inner part. A further embodiment variant also discloses a nut which may be screwed onto a thread of the transmission shaft, which is axially fixed but rotationally connected to a threaded sleeve, which is screwed via an external thread molded on its axial extension into a sleeve having internal thread, which is in turn welded to the joint inner part. These solutions are costly and complex, and require a relatively large number of components which must be mounted in a complicated manner one inside another and, in addition, welding is also necessary in some embodiments. It also is not possible to non-destructively detach the joint inner part and the screw-in sleeve.

SUMMARY OF THE INVENTION

It is an object of the present invention to provide a functionally reliable, cost-effective, and simple connecting arrangement for connecting a shaft journal, such as a transmission output, with a joint part, such as the joint inner part of a constant velocity joint.

Another object of the invention is to provide a connecting arrangement which can be assembled and/or disassembled in a simple manner.

These and other objects are achieved in accordance with the present invention as described and claimed hereinafter.

Accordingly, the connecting arrangement between a shaft journal mounted so it is axially fixed in relation to an assembly, such as a transmission in particular, and a joint part of a drive shaft which may be linked rotationally fixed thereon, is characterized in that a shaft nut, which may be screwed via its internal thread onto the external thread of the shaft journal, is provided with a further thread, onto which a further nut may be screwed via a mating thread or counter-thread, and an axially acting form-locking connection is provided between this further nut and the joint part which may be connected in a rotationally fixed manner to the shaft journal.

After assembly of the transmission, the shaft nut is screwed using its internal thread onto the external thread of the transmission shaft journal, until an axially oriented projection of the shaft nut contacts the inner ring of a roller bearing. In this state, faultless and simple noise testing and also balancing may be performed without any problems.

After the transmission has been installed in the vehicle, the drive shaft, such as the universal shaft including the joint, is installed, in particular having a constant-velocity fixed joint, with the joint external part connected in rotationally fixed manner to the universal shaft, which is pushed over the joint inner part with its longitudinal teeth engaging the longitudinal teeth of the transmission shaft journal. The further nut, which is retained on the joint inner part by the axially acting form-locking connection and yet is still rotatable, is screwed via its thread onto the counter-thread of the shaft nut so that the joint inner part is tightened further on the spline teeth via the axially acting form-locking connection, until the joint inner part contacts and is clamped against a centering shoulder on the transmission shaft journal.

The shaft nut may be constructed in such a way that the further thread for the counter-thread of the further nut is an external thread. However, alternatively, the external thread may be provided on the further nut and a corresponding internal thread may be provided on the shaft nut.

The axially acting form-locking connection between the further nut and the joint part, for example, the joint inner part of a constant-velocity joint, may be a detachable connection which advantageously may be formed by a snap connection. Alternatively it may be an unlockable connection, a bayonet-type connection, a catch connection or any other type of latchable connection.

However, the form-locking connection may also be produced by a thread provided on the joint inner part and a counter-thread provided on the further nut. It may be especially advantageous if the thread on the joint inner part and its counter-thread on the further nut have a different pitch direction than the thread on the shaft nut and its counter-thread on the further nut, so that by rotation in one direction, the further nut is screwed onto the shaft nut and the joint inner part is simultaneously tightened further against the shaft journal.

Upon detachment, the connection between further nut and shaft nut is released by rotation in the other direction, and likewise the connection between the further nut and the joint inner part, and the joint inner part is then pushed off the longitudinal teeth of the shaft journal. With the screwing movement, i.e., with the rotation of the further nut, a greater axial path is traversed by the joint inner part relative to the shaft journal under the force of the shaft nut than the path of the further nut on the shaft nut.

The thread on the joint inner part and its counter-thread on the further nut may, however, also have a different pitch than the further thread on the shaft nut and its counter-thread on the further nut.

It is advantageous to provide a seal between the shaft nut and the further nut.

Furthermore, it is advantageous if a seal is provided between the further nut and the shaft internal part. It is especially advantageous if the seal is axially biased against the further nut, i.e., is pressed against the further nut under axial pre-tension.

Furthermore, it may be advantageous if this further seal is radially biased, i.e., presses under radial pre-tension, for example, against a shoulder protruding in the axial direction from the further nut.

An especially advantageous embodiment results if the seal provided between the further nut and the joint inner part is constructed in one piece with a seal which exerts a sealing function between joint inner part and joint external part and thereby seals the joint.

As already noted, it is advantageous if the form-locking connection between the further nut and the joint part is a detachable connection, which may be produced in an especially simple way in that a radially inwardly protruding collar on the further nut engages behind a radially outwardly protruding bead or shoulder on the joint part, with one of the contours, i.e., shoulder or collar, having the form of a circular ring, and the other contour, i.e. collar or shoulder, having an oval form, whose shorter axis is less than the diameter of the contour formed as a circular ring, and the areas of the elliptically formed contour associated with the longer axis projecting radially into a grooved recess of the other part. Such a connection may be formed in a simple way by latching and detached by unlatching.

BRIEF DESCRIPTION OF THE DRAWINGS

The invention will be explained in further detail hereinafter with reference to illustrative preferred embodiments shown in the accompanying drawing figures, in which:

FIG. 6A is a part-sectional view of an end of the shaft joint portion of the connecting arrangement; and FIG. 6B is a view showing overlap of certain areas of the structure shown in FIG. 6A.

DETAILED DESCRIPTION OF EMBODIMENTS

Figure 1:
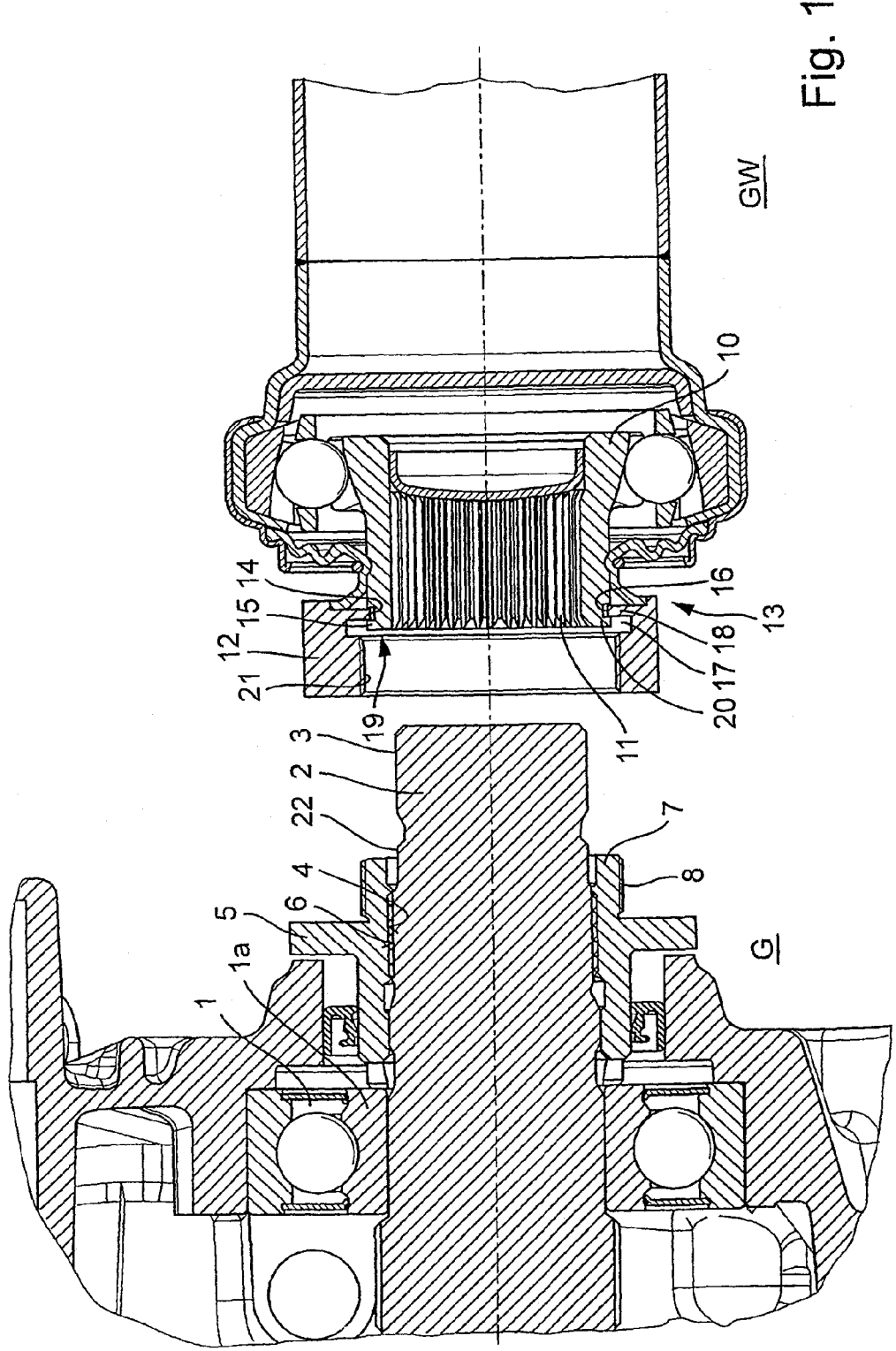
FIG. 1 shows a connecting arrangement in the disassembled state.

As can be seen from FIG. 1, a shaft journal 2 mounted in a bearing 1 projects out of a transmission G, which is only partially shown but is completely assembled. The shaft journal 2 has longitudinal teeth 3 and a section having an external thread 4. A shaft nut 5 is screwed onto this external thread 4 using its counter-thread 6, which is constructed as an internal thread, and clamped against the inner ring 1a of the bearing. An external thread 8 is provided on an axial projection 7.

A shaft of a universal joint or Cardan joint GW has a constant-velocity joint fixed to its end facing the transmission. The inner part 10 of the constant velocity joint has longitudinal counter teeth 11 which mate with the longitudinal teeth 3 of the shaft journal.

A further nut 12 is fixed on the joint inner part 10 via an interlocking or form-locking connection 13, which acts in the axial direction. To produce this connection, the joint inner part has a groove-shaped recess 14, which is delimited in one axial direction by a radially outwardly protruding bead or shoulder 15 and in the other axial direction by a stop 16. The further nut 12 also has an internal thread 21 constructed as the counter-thread to the external thread 8 of the shaft nut 5.

The further nut 12 also has a groove 17 and a radially inwardly protruding collar 18. In the present illustrative embodiment, the shoulder 15 has an oval or elliptical construction and has areas 19, which extend on both sides of the longer axis of the elliptical shape of the shoulder 15, and which overlap with areas of the circular collar 18. The areas 20, which are associated with the shorter axis of the elliptical shape of the shoulder 15, are smaller than the diameter of the collar 18, so that it is possible to thread, i.e., tilt in or insert, the shoulder 15 past the collar 18 of the further nut 12. The oval or elliptical construction and the areas of overlap are shown in FIGS. 6A and 6B.

To attach the joint shaft GW to the shaft journal 2 and produce a rotationally-fixed connection between joint inner part 10 and the shaft journal 2 via the longitudinal teeth 3, 11, the joint shaft is first pushed axially onto the shaft journal 2 with the teeth 11 of the joint inner part 10 engaging the teeth 3 of the shaft journal 2 until the internal thread 21 of the further nut 12 abuts the thread 8 of the shaft nut 5. Then by rotating the nut 12, the joint inner part 10 is axially tightened against the shaft journal 2 by the engagement between the collar 18 and the areas 19 of shoulder 15 until the joint inner part 10 engages a centering region 22 on shaft journal 2. This situation is depicted in FIG. 2.

Figure 2:
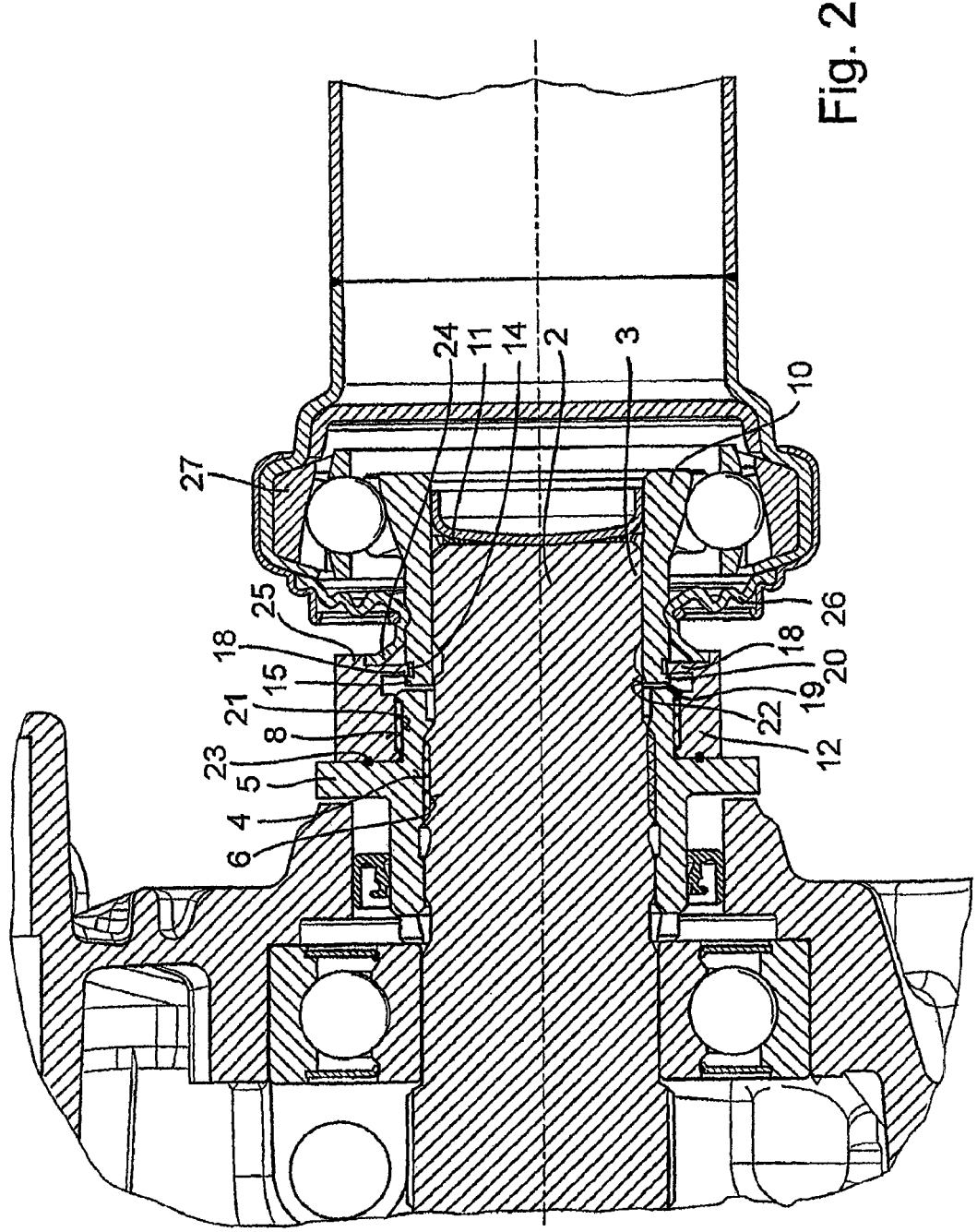
FIG. 2 shows the connecting arrangement of FIG. 1 in the assembled state.

FIG. 2 shows the shaft nut 5, which is screwed onto the external thread 4 via its internal thread 6, and on whose external thread 8 the further nut 12 is tightened via its internal thread 21. It can thereby be seen that the joint inner part 10 is clamped against the centering shoulder 22 via the collar 18 and the areas 19.

A sealing ring 23 is provided between shaft nut 5 and the further nut 12. Another seal 24, which is fastened on the joint inner part 10, contacts the further nut under axial pre-tension and presses against a shoulder 25 of the further nut 12 under axial pre-tension. In the present illustrative embodiment, the seal 24 is constructed in one piece with a seal 26 which acts between joint outer part 27 and joint inner part 10.

As previously noted, in the present illustrative embodiment the joint inner part 10 is provided with a shoulder 15, which has an oval and/or ellipsoidal construction and comprises areas 19 arranged in the vicinity of the longer axis and areas 20 arranged in the vicinity of the shorter axis.

The arrangement may also be reversed, in that the collar 18 may have an oval construction and the bead or shoulder 15 have a circular configuration.

Figure 3:
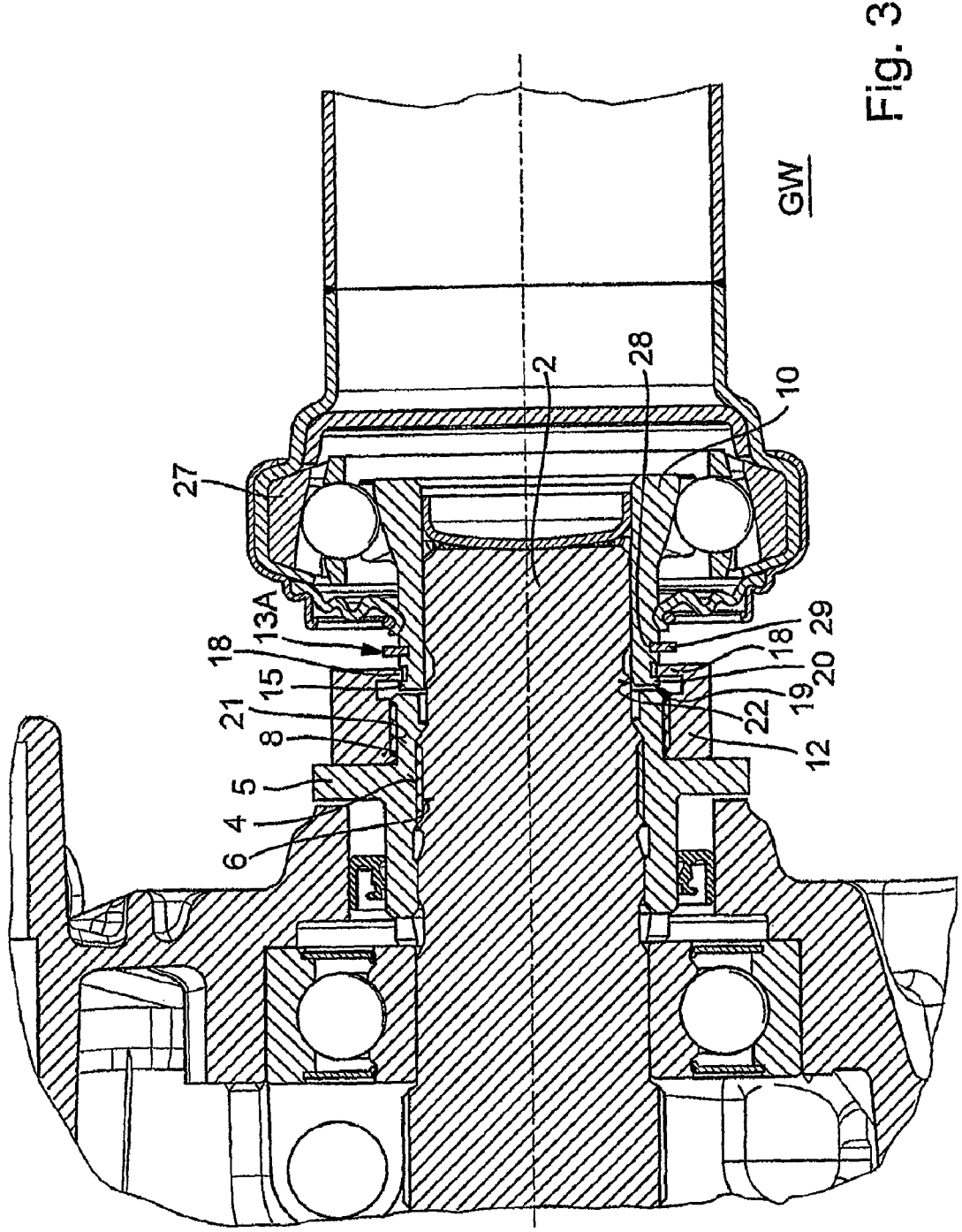
FIG. 3 shows an embodiment of the connecting arrangement of the inventment.

FIG. 3 again shows the connecting arrangement having a shaft nut 5 seated via its thread 6 on the thread 4 of the shaft journal 2, and furthermore, a further nut 12 screwed via its internal thread 21 onto the external thread 8 of the shaft journal. The collar 18 of further nut 12 pulls the shoulder 15 (i.e., the protruding oval areas 19 thereof) of the joint inner part 10 against the centering region 22 of the shaft journal 2. The form-locking, connection 13A differs from that of FIGS. 1 and 2 in that in FIG. 3, the second contour, between which the collar 18 is axially clamped, is formed by a snap ring 29 provided in a groove 28, via which the pulling off or pushing on of the joint shaft GW may take place.

Figure 4:
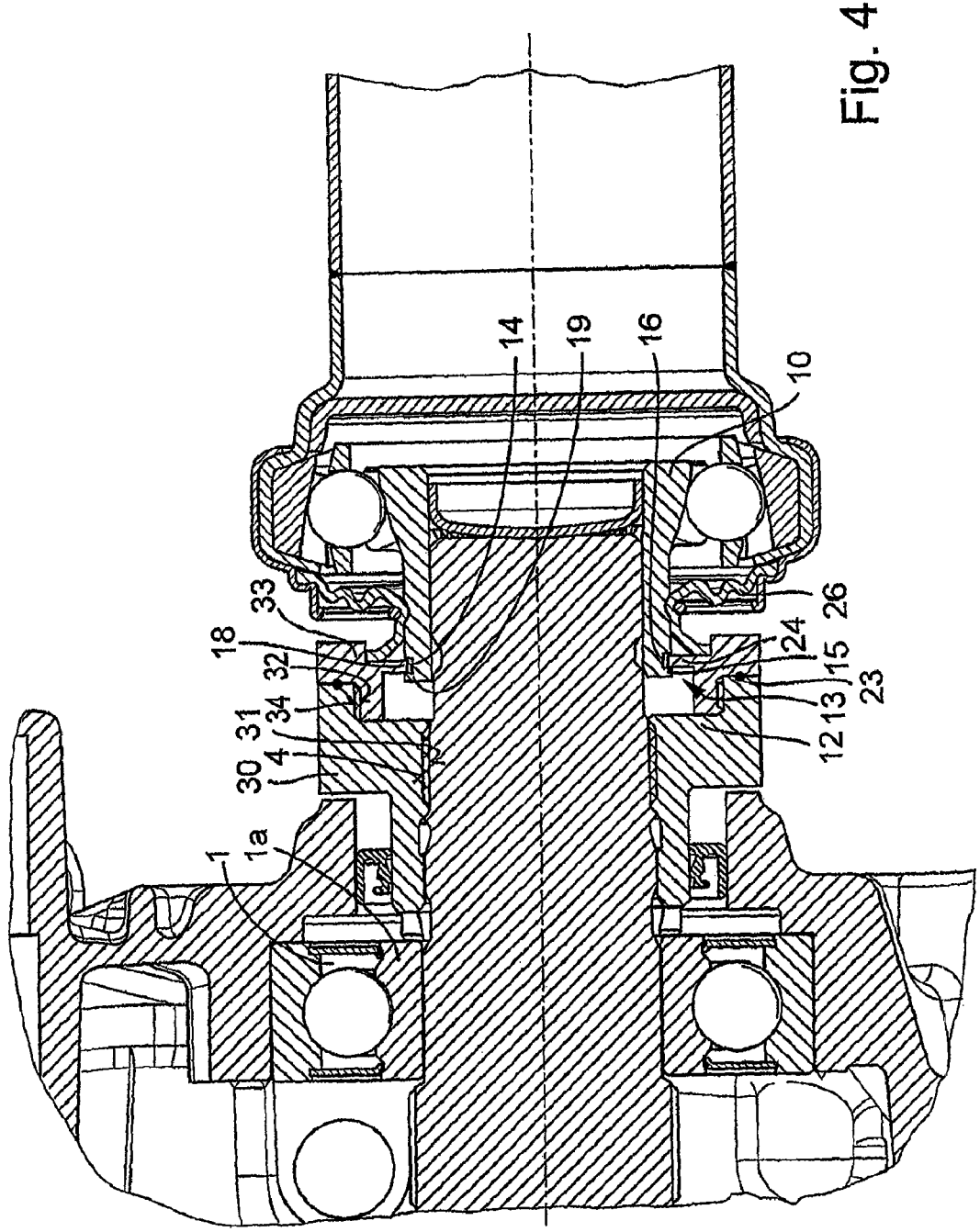
FIG. 4 shows a further embodiment of the connecting arrangement of the invention.

In FIG. 4, a shaft nut 30 is also tightened using its internal thread 31 on the external thread 4 of the shaft journal 2 and clamped against the inner ring 1a of a roller bearing 1.

The shaft nut 30 has a further internal thread 32, into which a further nut 33 is screwed via its external thread 34. As in FIGS. 1 and 2, the form-locking connection 13, which acts in both axial directions, is produced in this case by a collar 18 which engages in a grooved recess 14 in the joint inner part. The groove is delimited by two cantilevers 19 of the oval-shaped shoulder 15, as in FIGS. 1 and 2. The stop contour 16 is in turn provided on the joint inner part 10 on the side of the collar 18 facing away from the shaft nut 30. A seal 23 is provided between shaft nut 30 and the further nut 33. In the same way as in FIGS. 1 and 2, a seal 26, which seals the joint inner part to the joint outer part, is also constructed in FIG. 4 in one piece with a further seal 24, which seals the joint inner part to the further nut 33.

Figure 5:
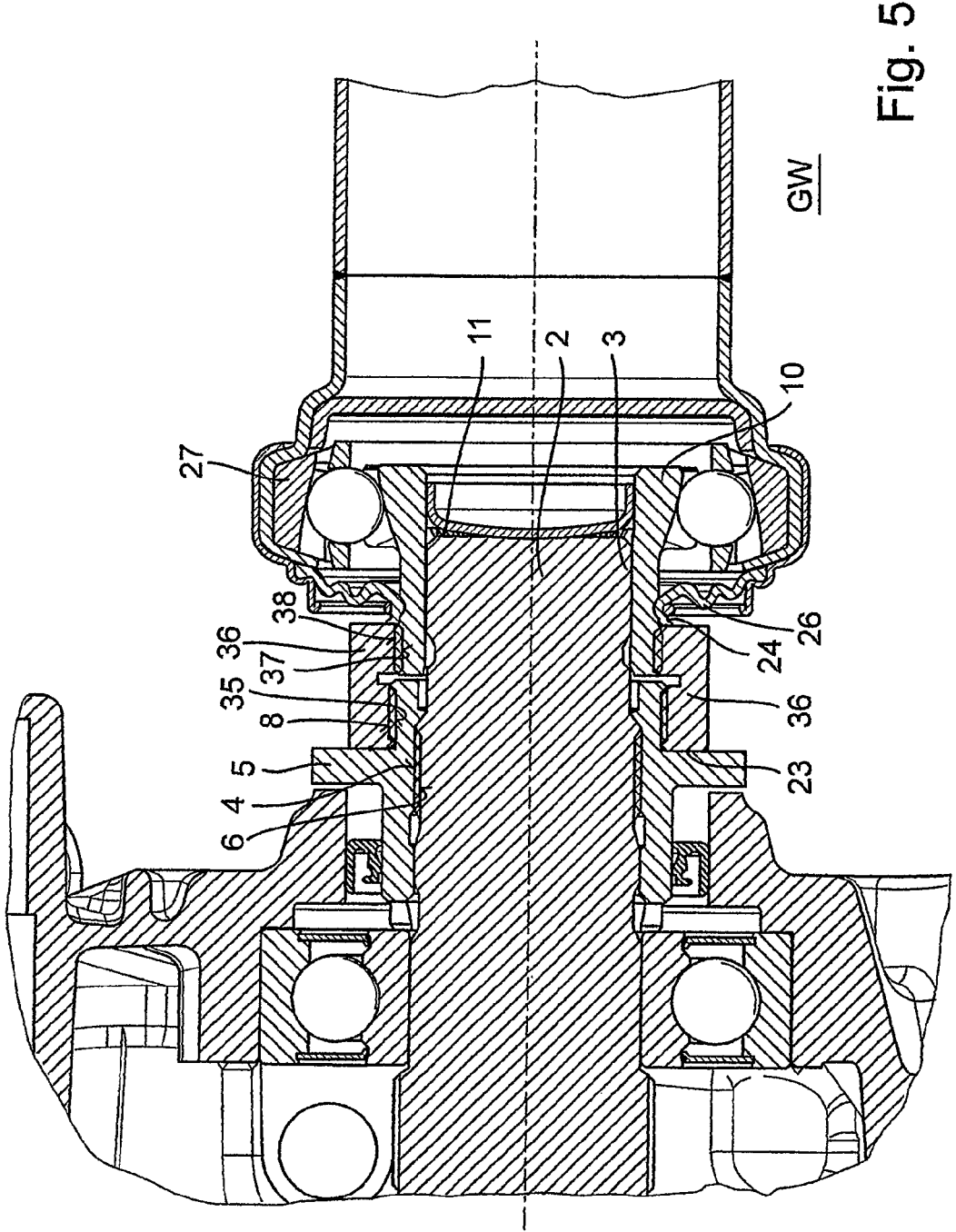
FIG. 5 shows an even further embodiment of the connecting arrangement of the invention.

FIG. 5 shows the shaft nut 5 screwed onto the shaft journal 2 via the connecting threads 4, 6, and the further nut 36 screwed via its internal thread 35 onto the thread 8. The nut 36 has an internal thread 37 on the side opposite from thread 35, using which it is screwed onto the counter-thread 38, which is arranged on the joint inner part 10. The threads 8, 35 have an opposite pitch direction compared to the threads 37, 38. They may also have different pitches, whereby the threads 37, 38 can be constructed with a steeper pitch than the threads 8, 35, so that it is ensured that the thread turns 37, 38 are always used up before the further nut 36 contacts the shaft nut 5 and is clamped against it. The threads 8, 35 and 37, 38 may also have different lengths. In particular, the threads 37, 38 may be shorter in length than the threads 8, 35. A seal 23 also ensures in this case, together with the seal 26, the seal 24, and the cover, that grease provided between the longitudinal teeth 3 and 11, which prevents wear arising due to micro-movements upon the load change at the inserted connection, cannot escape to the exterior. The joint arrangement can also effectively prevent contaminants from getting into the joint.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A connecting arrangement for connecting an axially fixed shaft journal and a pivotable joint part in a rotationally fixed manner, comprising:
   a shaft nut having an internal thread which is screwed onto an external thread of the shaft journal;
   said shaft nut having another thread onto which a mating counter-thread of a further nut is screwed;
   and said further nut having an axially acting form-locking connection to said joint part;
   wherein
   said pivotable joint part is a joint inner part of a constant-velocity fixed joint;
   a first seal is provided between said joint inner part and a joint outer part;
   a second seal is provided between the joint inner part and said further nut; and
   said second seal is axially biased against said further nut.

2. A connecting for connecting an axially fixed shaft journal and a pivotable joint part in a rotationally fixed manner, comprising:
   a shaft nut having an internal thread which is screwed onto an external thread of the shaft journal;
   said shaft nut having another thread onto which a mating counter-thread of a further nut is screwed;
   and said further nut having an axially acting form-locking connection to said joint part;
   wherein
   the axially acting form-locking connection of said further nut to said joint part is formed by a radially inwardly projecting collar on said further nut which engages behind a radially outwardly projecting shoulder on said joint part;
   one of said shoulder and collar having a circular ring construction; and
   the other having an oval construction with a shorter axis which is smaller than the diameter of said circular ring.

* * * * *